Dec. 6, 1960     W. P. OEHLER ET AL     2,963,095

FURROW LEVELING ATTACHMENT

Filed March 30, 1956

INVENTORS
WILLIAM P. OEHLER
AND CHARLES H. YOUNGBERG.
BY
ATTYS

United States Patent Office 2,963,095
Patented Dec. 6, 1960

2,963,095

FURROW LEVELING ATTACHMENT

William P. Oehler and Charles H. Youngberg, Moline, Ill., assignors, by mesne assignments, to Deere & Company, a corporation of Delaware Filed Mar. 30, 1956, Ser. No. 575,038

9 Claims. (Cl. 172—178)

The present invention relates generally to agricultural implements and more particularly to disk harrows and similar implements that tend to leave the soil ridged or furrowed.

The object and general nature of the present invention is the provision of a furrow filling or furrow leveling attachment, particularly adapted to be carried by a disk harrow for filling or leveling any furrows left by the laterally outermost disk.

In any conventional disk harrow, in which the gang, or each gang, includes a plurality of disks arranged in spaced apart coaxial relation, each disk cuts into the ground and substantially fills the furrow formed by the action of the next preceding disk. However, there is, of course, ordinarily no means by which the furrow formed by the rearmost disk can be filled. Therefore, in the ordinary double action disk harrow, each pass across the field tends to leave a furrow at each side of the path of movement of the harrow.

Previously, attempts have been made to provide means for leveling the ground by filling the laterally outermost furrow, such means taking the form of either of a fixed blade or an outrigger type disk, usually smaller in diameter. The latter leave furrows that are not filled, and fixed blades are not satisfactory for this purpose because they do not readily accommodate changes in the depth of operation of the harrow, the fixed blades not acting at all during shallow operation and digging in too deeply if the harrow operates at greater depth.

One important feature of the present invention is the provision of a furrow filling blade mounted so as to scrape quantities of soil into the furrow formed by the adjacent laterally outermost disk, which blade is resiliently mounted in a yielding manner so as to provide for proper furrow filling operation at different depths of operation of the harrow.

A further feature of this invention is the provision of a furrow filling or furrow leveling blade in which the latter is pivotally mounted and releasably held in operating position whereby, when released, the blade may be folded over onto the disk harrow to facilitate passage of the implement through gates, long narrow lanes and the like.

An additional feature of this invention is the provision of a furrow filling attachment for disk harrows and the like, in which the furrow leveling blade is pivoted for relative free movement relative to the associated standard so as to accommodate backing of the harrow, as may be required in some instances during the angling and/or straightening of the disk harrow, or which may occur inadvertently, as by unintentional backing of the tractor.

These and other objects and advantages of the present invention will be apparent to those skilled in the art after a consideration of the following detailed description, taken in conjunction with the accompanying drawings, in which.

Figure 1:
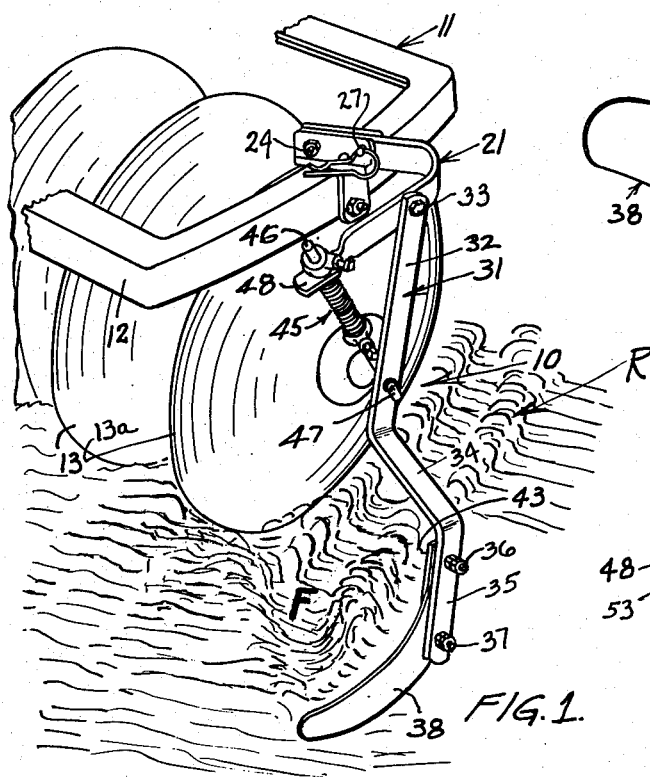
Fig. 1 is a fragmentary perspective view, showing a furrow leveling attachment, constructed according to the principles of the present invention, connected to the outer end of one of the gangs of a disk harrow.

The disk harrow, indicated in its entirety by the reference numeral 10, on which the furrow leveling attachment of the present invention has been mounted, is represented in Fig. 1 by the rear right hand gang 11. Each gang 11 comprises a gang frame 12 and a gang or series of disks 13 arranged in axial alignment and mounted on the usual gang bolt 14 with spacers between the disks, and suitable bearing means by which the gang of disks is connected with the frame 11.

In operation, the conventional tandem double action disk harrow works a strip of ground, and in so doing, the laterally outermost disk of the front gangs (not shown) throws up a ridge R (Fig. 1), and the laterally outermost rear disk, indicated at 13a (Fig. 1) at each side of the implement leaves a furrow, indicated at F in Fig. 1, the laterally outermost rear disks taking some of the soil from the adjacent ridges R but usually not all. It is the purpose of the present invention to provide means, preferably one for each side of the implement, to fill or substantially fill this furrow, thereby leveling the ground.

The furrow leveling attachment of the present invention is indicated in its entirety by the reference numeral 15 and comprises a supporting member 16 in the form of a pivot casting that is adapted to be fastened to the frame 12 by means of an attaching bolt 17. The member 16 includes a transversely disposed upper section having an upwardly facing laterally extending slot 18 in the walls of which two sets of aligned apertures 19 are formed. A generally L-shaped bracket 21 is connected to the member 16, the bracket 21 including a forward transversely extending leg 22 disposed in the slotted portion 18 of the member 16, and a rearwardly extending leg 23. The transversely extending leg 22 is provided with a pair of apertures, adapted to be aligned with the sets of apertures 19, and through one set of aligned apertures a pivot bolt 24 is disposed, thereby providing for swinging movement of the bracket 21 about a generally fore-and-aft extending axis. A locking pin 27 is disposed in the other set of aligned apertures and, when so disposed, the pin 27 holds the bracket 21 against movement about the aforesaid axis, thus retaining the bracket 21 in what might be termed an operating position.

Figure 3:
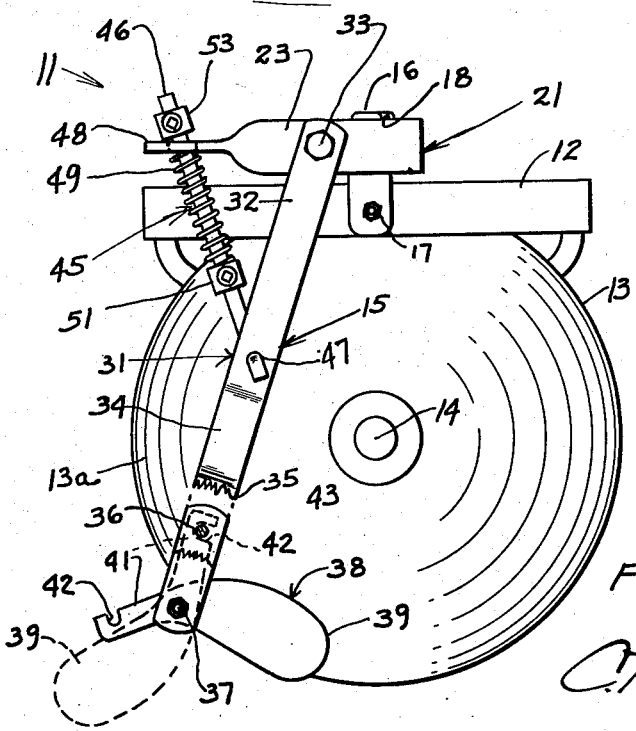
Fig. 3 is a view similar to Fig. 1, showing the leveling blade in the position it takes when the harrow is backed.
Figure 4:
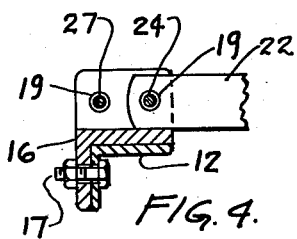
Fig. 4 is an enlarged view taken generally along the line 4—4 of Fig. 2, certain parts being shown in section.

Pivotally connected to the rearwardly extending leg section 23 of the bracket 21 is a blade standard 31 that is of generally Z-shaped formation, having an upward generally vertical section 32 that is apertured to receive a pivot bolt 33 by which the upper end of the standard 31 is pivoted to the rearwardly extending leg 23 forward of the rear end of the latter. The diagonal section 34 connects the vertical section 32 with the lower blade-receiving section 35. This section is provided with a pair of vertically spaced apertures in which connecting bolts 36 and 37 are disposed. A blade 38 is pivotally mounted on the lower bolt 37 and is of particular construction. The blade 38 includes a ground engaging curved portion 39 that normally extends generally rearwardly and laterally inwardly from the pivot bolt 37. This is the part of the blade 38 that, as best shown in Fig. 1, acts on the adjacent soil and moves the latter into the furrow F formed by the laterally outermost disk 13a. The other portion of the furrow leveling blade 38 is indicated by the reference numeral 41 and extends generally upwardly, being notched, as indicated at 42 (Fig. 3). The notched portion 42 normally serves as stop means engaging the upper bolt 36 to prevent any upward swinging of the ground engaging section 39 beyond the position shown in Fig. 1. The bolts 36 and 37, at their laterally inner ends, carry a guide strap 43, the forward portion of the blade 38 fitting in between the guide strap 43 and the lower section 35 of the blade standard 31. Through suitable means, such as bushings or the like, the blade 38 is freely pivotal on the lower bolt 37 but, as stated above, the notched portion 42 holds the blade in about the position shown in Fig. 1 during normal forward travel of the implement.

Mention was made above of the fact that the standard 31 is pivotally mounted on the bolt 33. The arrangement is such that the standard 31, together with the blade 38, is swingable generally rearwardly and upwardly about a transverse axis, as defined by the bolt 33. This swinging movement is yieldingly resisted, however, by resilient means 45 that includes a rod member 46 swingably connected at its lower end, as at 47, with the standard and slidably disposed in an opening formed in the rear end portion 48 of the bracket leg section 23. A coil spring 49 is disposed at its upper end against the rear end of the leg section 23, and at its lower end of the spring 49 bears against an adjustable set screw collar 51, which may be fixed in different vertical positions along the rod 46. The latter extends upwardly through the opening in the rear end 48 of the bracket 21 and the upper end of the rod 46 carries a second set screw collar 53. The latter collar holds the standard 31 against downward swinging under the influence of the spring 49, and the latter is of sufficient strength normally to hold the standard 31 and the blade 38 down in ground engaging or ground working position. Normally, a disk harrow, such as the one indicated at 10, can be operated at different depths, depending upon the angle in which the front and rear gangs of the disk harrow are disposed, and according to the principles of the present invention, the yielding of the resilient unit 45 permits the blade 38 to operate so as to fill the furrow F more or less irrespective of the depth at which the disks 13 and 13a operate. By changing the position of the lower set screw collar 51, the spring 49 may be brought to the necessary adjustment to permit the blade 38 to operate at different depths of adjustment of the disks 13.

Figure 2:
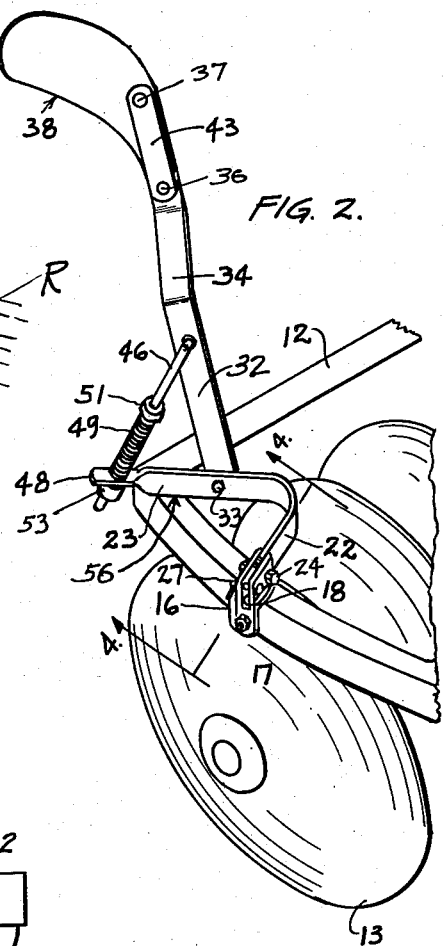
Fig. 2 is a similar fragmentary perspective view, showing the furrow leveling attachment swung over into a transport position.

As will be seen from Fig. 1, the furrow leveling attachment 15 extends laterally outwardly beyond the outermost portion of the rear gang, and it will be understood that there is one of such attachments at each side of the harrow. This materially increases the over-all width of the implement, and this increased width of implement may not be desirable in passing along narrow lanes, through gates and the like, and according to the principles of our invention, we provide means whereby each of the furrow filling or furrow leveling attachments may be swung upwardly over and onto the laterally outer end of the rear gang when it is desired to reduce the over-all width of the implement. This is illustrated in Fig. 2, and in order to swing the furrow leveling attachment into its transport or inoperative position, all that it is necessary to do is to remove the releasable pin 27 (Fig. 1) and then swing the attachment into its transport position. In this position, it will be seen that the attachment is adapted to engage the adjacent portion of the gang frame so as to hold the attachment out of contact with the adjacent disk 13. The point of contact in the transport position is indicated by the reference numeral 56 in Fig. 2.

In many instances, disk harrows of the type indicated by the reference numeral 10 may be angled and/or straightened by a backward movement of the harrow. In order to accommodate this action, without bending the blade 38 or breaking it or any other part, each blade 38 is so arranged as to be free to swing forwardly about the lower pivot bolt 37 when such rearward movement occurs. When the disk harrow is backed, with the furrow leveling parts in the position shown in Fig. 1, the rear end of the blade 38 swings downwardly and forwardly about the pivot bolt 37, which movement is accommodated since the blade 38 is freely pivotal on the bolt 37. Fig. 3 shows the blade 38 in a position accommodating the rearward movement just referred to. When the implement starts forwardly again, the blade automatically swings into the position shown in Fig. 1, the notched section 42 acting as a stop in cooperation with the upper bolt 36, thus holding the blade 38 in its normal working position, as shown in Fig. 1.

While we have shown and described above the preferred structure in which the principles of the present invention have been incorporated, it is to be understood that our invention is not to be limited to the particular details, shown and described above, but that, in fact, widely different means may be employed in the practice of the broader aspects of our invention.

What we claim, therefore, and desire to secure by Letters Patent is:

1. A leveling attachment for disk harrows and the like, comprising a support adapted to be fixed to one end of a disk harrow or the like, said support including a transversely disposed upper section having an upwardly facing laterally extending slot, a bracket comprising a transverse portion disposed in said slot and a rearwardly extending section, pivot means adjacent the inner end of said slotted portion for pivotally connecting the inner part of said transverse portion of the bracket for movement relative to said support about a generally fore-and-aft extending axis, a standard pivoted adjacent one end to the forward portion of the rearwardly extending section of said bracket for movement relative thereto about a generally transverse axis, cushion spring means connected between the rear portion of said rearwardly extending section and said standard, a leveling blade connected to the standard adjacent the other end thereof, and means fixing the outer portion of the transverse bracket portion to the outer portion of the slotted support section for releasably locking said bracket to said support, said bracket when released being adapted to be swung about the axis of said pivot means over onto the adjacent end of the disk harrow into a transport position.

2. A leveling attachment for disk harrows and the like, comprising a support adapted to be fixed to one end of a disk harrow or the like, said support including a part having a vertically opening transversely extending slot, a bracket comprising a generally L-shaped member having one leg extending transversely and adapted to be disposed in said slot and a second leg extending in a generally fore-and-aft direction, a blade standard pivoted adjacent one end to said second leg and adapted to swing relative to the bracket in a generally fore-and-aft direction, a leveling blade connected to the other end of said standard, resilient means connected between the standard and the rear portion of said second leg for opposing said swinging movement, two sets of registering apertures in said first leg and the associated slotted portion of said support, pivot means disposed in one of said sets, whereby said bracket and standard may be swung upwardly and inwardly relative to the disk harrow, and a releasable locking pin disposable in the other set of apertures to hold said bracket, standard and blade in working position.

3. A leveling attachment for disk harrows and the like, comprising a support adapted to be fixed to one end of a disk harrow or the like, said support including a part having a vertically opening transversely extending slot, a bracket comprising a generally L-shaped member having one leg extending transversely and adapted to be disposed in said slot and a second leg extending in a generally fore-and-after direction, a blade standard pivoted adjacent one end to said second leg and adapted to swing relative to the bracket in a generally fore-and-aft direction, a leveling blade connected to the other end of said standard, two sets of registering apertures in said first leg and the associated slotted portion of said support, pivot means disposed in one of said sets, whereby said bracket and standard may be swung upwardly and inwardly relative to the disk harrow, and a releasable locking pin disposable in the other set of apertures to hold said bracket, standard and blade in working position.

4. The combination with a disk harrow having a gang of disks and a gang frame disposed generally transversely, of a furrow filler support fixed to the laterally outer portion of said gang frame, a bracket pivoted at a laterally inner portion to said support and swingable relative to the latter between a position laterally outward of said frame and a position over and laterally inward of the outer end of the frame, releasable means holding said bracket in its outer position, and a furrow filler blade carried by said bracket laterally outward of the end of the gang frame and associated disks in the outer position of said pivoted bracket and laterally inward of the gang frame end and associated disks in the inner position of said pivoted bracket, said furrow filler blade being pivoted to said bracket for movement relative thereto about a transversely extending axis and having a soil-engaging portion disposed rearwardly of said latter axis, and stop means acting against said blade to limit movement of the latter in one direction about said latter axis, said blade being freely swingable in the other direction to accommodate backing of said disk harrow.

5. A leveling attachment for a disk harrow gang having a gang frame or the like, said attachment comprising a generally L-shaped bracket including a first portion pivotally connected at its laterally inner end to the outer end of the disk harrow gang substantially in line with the axis of the gang frame for movement about a generally fore-and-aft extending axis and extending laterally outwardly from the outer end of said gang frame, said bracket also including a rearwardly extending portion, said bracket being swingable relative to said frame about said generally fore-and-aft extending axis, releasable means connected with said bracket to hold the latter against swinging relative to said gang frame, a blade standard pivoted to said rearwardly extending bracket portion adjacent its juncture with said transverse portion and arranged to swing rearwardly in a direction generally transversely of the disk axis of the gang, means connected with said standard and the rear part of said rearwardly extending bracket portion to resiliently oppose pivoting of said standard relative to said rearwardly extending bracket portion, a leveling blade, and means connecting said blade to said standard.

6. The combination with a disk harrow including a generally transverse disk gang having a gang frame, of a leveling attachment comprising a generally L-shaped bracket, means pivotally mounting the bracket on the laterally outer end of the gang frame for swinging movement about a generally fore-and-aft extending axis between a laterally inner position in which the bracket overlies the outer end of said gang frame and a position laterally outwardly of the adjacent outermost portion of the gang frame, means releasably holding said bracket in its laterally outer position, a standard pivoted at its upper end to said bracket at a point normally laterally outwardly of the outer end of the gang frame, said standard being thereby mounted for movement about a generally transverse axis relative to said standard, a furrow filing blade connected to the lower end of said standard and normally disposed thereby laterally outwardly of the adjacent disk, and resilient means connected to act between said bracket and said standard to resist swinging movement of the latter about said transverse axis.

7. The combination with a disk harrow having a gang of disks and a gang frame disposed generally transversely, of a furrow filler support fixed to the laterally outer portion of said gang frame, said support including a portion extending laterally outwardly generally parallel with said gang frame, a bracket having a first generally laterally extending portion pivoted at a laterally inner portion to the laterally inner part of said support and swingable relative to the latter between a position laterally outward of the laterally outer end of said frame and a position over and laterally inward of the outer end of the frame, said bracket having a second portion disposed laterally outward of said first portion and lying generally in a fore-and-aft extending direction, releasable means holding said bracket in its outer position, and means including a furrow filler blade carried by said second portion of the bracket and disposed, when the bracket is in its position extending laterally outwardly of the gang frame, laterally outward beyond the end of the gang frame and associated disks and laterally inward of the gang frame end and associated disks in the inner position of said pivoted bracket.

8. The combination with an agricultural frame and ground engaging means adapted to form a furrow in the soil, of a furrow filler support carried by said frame, a bracket having a laterally inner portion pivoted to said support and swingable relative to the latter between a position laterally outward of said frame and a position over and laterally inward of the outer end of the frame, releasable means holding said bracket in its outer position, said bracket including a laterally outer portion and means including a furrow filler blade carried by said bracket, said last mentioned means being pivoted to said bracket for movement relative thereto about a transversely extending axis and said blade having a soil-engaging portion disposed rearwardly of said latter axis, and stop means acting against said blade to limit movement of the latter in one direction about said latter axis, said blade being freely swingable in the other direction to accommodate backing of said implement.

9. A leveling attachment for disk harrows and the like, comprising a support fixed to one end of a disk harrow or the like, said support including a part extending transversely relative to the direction of travel of the disk harrow, a bracket comprising a generally L-shaped member having one leg extending transversely alongside said support part and a second leg extending in a generally fore-and-aft direction, a blade standard, generally transverse pivot means swingably connecting said standard adjacent one end to said second leg whereby said standard is adapted to swing relative to the bracket in a generally fore-and-aft direction, a leveling blade connected to the other end of said standard, two sets of registering apertures in said first leg and said support part, pivot means disposed in one of said sets, whereby said bracket and standard may be swung upwardly and inwardly relative to the disk harrow, and a releasable locking pin disposable in the other set of apertures to hold said bracket, standard and blade in working position.

References Cited in the file of this patent

UNITED STATES PATENTS

| | | |
|---|---|---|
| 460,540 | Smith | Sept. 29, 1891 |
| 676,476 | Secor et al. | June 18, 1901 |
| 1,021,042 | Heylman | Mar. 26, 1912 |
| 1,109,661 | Carroll | Sept. 8, 1914 |
| 1,144,151 | Michael | June 22, 1915 |
| 1,635,442 | Sigurd | July 12, 1927 |
| 2,096,230 | Elliott | Oct. 19, 1937 |
| 2,424,014 | Bobeldyk | July 15, 1947 |
| 2,483,011 | Hudson | Sept. 27, 1949 |